(12) United States Patent
Liu et al.

(10) Patent No.: US 10,477,249 B2
(45) Date of Patent: Nov. 12, 2019

(54) VIDEO PROCESSING FOR MASKING CODING ARTIFACTS USING DYNAMIC NOISE MAPS

(75) Inventors: Yuxin Liu, Cupertino, CA (US); Hsi-Jung Wu, San Jose, CA (US); Xiaojin Shi, Fremont, CA (US); Chris Yoochang Chung, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 2321 days.

(21) Appl. No.: 12/479,068

(22) Filed: Jun. 5, 2009

(65) Prior Publication Data
US 2010/0309985 A1    Dec. 9, 2010

(51) Int. Cl.
| | | |
|---|---|---|
| *H04N 7/12* | (2006.01) | |
| *H04N 11/04* | (2006.01) | |
| *H04N 19/86* | (2014.01) | |
| *H04N 19/46* | (2014.01) | |
| *H04N 19/117* | (2014.01) | |
| *H04N 19/136* | (2014.01) | |
| *H04N 19/44* | (2014.01) | |

(52) U.S. Cl.
CPC ......... *H04N 19/86* (2014.11); *H04N 19/117* (2014.11); *H04N 19/136* (2014.11); *H04N 19/44* (2014.11); *H04N 19/46* (2014.11)

(58) Field of Classification Search
CPC .... H04N 19/117; H04N 19/136; H04N 19/44; H04N 19/46; H04N 19/86
USPC ....................................... 375/240.25, 240.27
See application file for complete search history.

(56) References Cited

U.S. PATENT DOCUMENTS

| | | | |
|---|---|---|---|
| 5,291,284 A * | 3/1994 | Carr .................. | H04N 19/61 375/240.12 |
| 6,285,798 B1 | 9/2001 | Lee | |
| 6,989,868 B2 | 1/2006 | Masukura et al. | |
| 7,432,986 B2 | 10/2008 | Winger | |
| 7,483,037 B2 | 1/2009 | Gies | |
| 7,593,465 B2 * | 9/2009 | Jia .................... | H04N 19/90 348/241 |
| 7,684,626 B1 | 3/2010 | Cote et al. | |

(Continued)

FOREIGN PATENT DOCUMENTS

WO    2009/005497 A1    1/2009

OTHER PUBLICATIONS

"Film Grain Technology—Specifications for H.264 | MPEG-4 AVC Bitstreams" SMPTE Registered Disclosure Document, RDD May 2006, Mar. 6, 2006, pp. 1-18.

*Primary Examiner* — Jessica M Prince
(74) *Attorney, Agent, or Firm* — Baker & Hostetler LLP (57) ABSTRACT

A video decoder system includes a video decoding engine, noise database, artifact estimator and post-processing unit. The video coder may generate recovered video from a data stream of coded video data, which may have visually-perceptible artifacts introduced as a byproduct of compression. The noise database may store a plurality of previously developed noise patches. The artifact estimator may estimate the location of coding artifacts present in the recovered video and select noise patches from the database to mask the artifacts and the post-processing unit may integrate the selected noise patches into the recovered video. In this manner, the video decoder may generate post-processed noise which may mask artifacts that otherwise would be generated by a video coding process.

24 Claims, 5 Drawing Sheets

FIG. 1
100

(56) References Cited

U.S. PATENT DOCUMENTS

| | | |
|---|---|---|
| 2003/0219073 A1* | 11/2003 | Lee .................. H04N 19/176 |
| | | 375/240.27 |
| 2004/0008787 A1 | 1/2004 | Pun et al. |
| 2004/0131121 A1 | 7/2004 | Dumitras et al. |
| 2005/0036558 A1 | 2/2005 | Dumitras et al. |
| 2005/0069040 A1* | 3/2005 | Francois ............ H04N 19/176 |
| | | 375/240.27 |
| 2005/0094003 A1 | 5/2005 | Thorell |
| 2005/0207492 A1* | 9/2005 | Pao .................. H04N 19/139 |
| | | 375/240.16 |
| 2006/0055826 A1 | 3/2006 | Zimmermann et al. |
| 2006/0171458 A1 | 8/2006 | Feng et al. |
| 2006/0182183 A1 | 8/2006 | Winger |
| 2007/0058866 A1 | 3/2007 | Boyce et al. |
| 2008/0063085 A1 | 3/2008 | Wu et al. |
| 2008/0088857 A1 | 4/2008 | Zimmer et al. |
| 2008/0109230 A1* | 5/2008 | Thumpudi ............ G10L 19/24 |
| | | 704/500 |
| 2008/0181298 A1 | 7/2008 | Shi et al. |
| 2008/0232469 A1 | 9/2008 | Nie et al. |
| 2008/0253448 A1 | 10/2008 | Lin et al. |
| 2008/0253461 A1 | 10/2008 | Lin et al. |
| 2008/0291999 A1 | 11/2008 | Lerouge et al. |
| 2009/0028244 A1 | 1/2009 | Winger et al. |
| 2010/0074548 A1 | 3/2010 | Pan et al. |
| 2010/0309987 A1 | 12/2010 | Concion et al. |
| 2011/0103709 A1 | 5/2011 | Kim |
| 2011/0235921 A1 | 9/2011 | Springer et al. |

\* cited by examiner

VIDEO PROCESSING FOR MASKING CODING ARTIFACTS USING DYNAMIC NOISE MAPS

BACKGROUND

The present invention relates to video coding/decoding systems and, in particular, to video coding/decoding systems that use noise templates in post-processing.

Video compression generally involves coding a sequence of video data into a lower bit rate signal for transmission via a channel. The coding often involves exploiting redundancy in the video data via temporal or spatial prediction, quantization of residuals and entropy coding. Video coding often is a lossy process—when coded video data is decoded after having been retrieved from a channel, the recovered video sequence replicates but is not an exact duplicate of the source video. Moreover, video coding techniques may vary based on variable external constraints, such as bit rate budgets, resource limitations at a video coder and/or a video decoder or display sizes that are being supported by the video coding systems. Thus, a common video sequence coded according to two different coding constraints (say, coding for a 4 Mbits/sec channel vs. coding for a 12 Mbits/sec channel) likely will introduce different types of data loss. Data losses that result in video aberrations that are perceptible to human viewers are termed "artifacts" herein. Other data losses may arise that are not perceptible to human viewers; they would not be considered artifacts in this discussion.

In many coding applications, there is a continuing need to maximize bandwidth conservation. When video data is coded for consumer applications, such as portable media players and software media players, the video data often is coded at data rates of approximately 8-12 Mbits/sec. Apple Inc., the assignee of the present invention, often achieves coding rates of 4 MBits/sec from source video of 1280×720 pixels/frame, up to 30 frames/sec. At such low bit rates, artifacts are likely to arise in decoded video data. Moreover, the prevalence of artifacts is likely to increase as further coding enhancements are introduced to lower the bit rates of coded video data even further.

Accordingly, the inventors perceive a need in the art for systems and methods to mask the effects of visual artifacts in coded video data. There is a need in the art for such techniques to mask visual artifacts dynamically, in a manner that adapts to video content. Moreover, there is a need in the art for such techniques that allow an encoder and decoder to interact in a synchronous manner, even if the encoder and decoder are unable to communicate in real time.

DETAILED DESCRIPTION

Embodiments of the present invention provide a video decoder system that may generate recovered video from a data stream of coded video data, which may have artifacts introduced as a byproduct of compression. A noise database may store a plurality of previously-developed noise patches. An artifact estimator may estimate the location of coding artifacts present in the recovered video and select noise patches from the database to mask the artifacts. A post-processing unit may integrate the selected noise patches into the recovered video. In this manner, the video decoder may generate post-processed noise that masks artifacts that otherwise would be generated by a video coding process.

Embodiments of the present invention further provide a video encoding system that may generate coded video data in which the artifacts may appear. A video coder may code source video data as coded video data and a decoder may decode the coded video data into recovered video data. Thus, the video encoder system may possess a copy of recovered video data as it would be obtained by the decoder. The encoder may include a noise database that may store noise patches. An artifact estimator may identify locations of artifacts in the recovered video data. A patch selector may select stored noise patches that mask the artifacts when integrated with the recovered video data during a post-processing operation.

Figure 1:
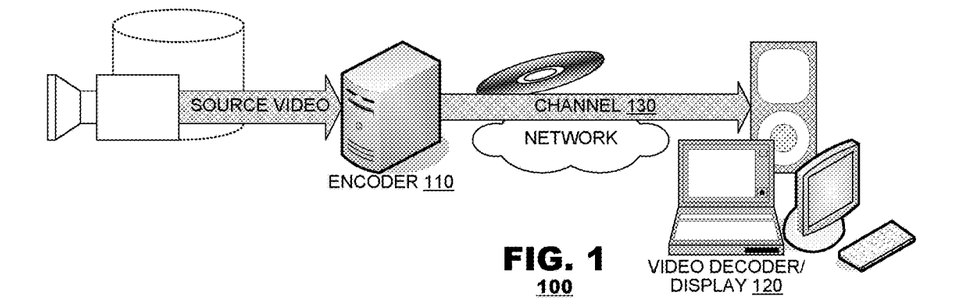
FIG. 1 illustrates a video coder/decoder system according to an embodiment of the present invention.

FIG. 1 illustrates a video coder/decoder system 100 suitable for use with the present invention that includes an encoder system 110 and a decoder system 120 provided in communication via a channel 130. The encoder system 110 may accept a source video sequence and may code the source video as coded video, which typically has a much lower bit rate than the source video. For example, the coded video data may have a bit rate of 3.5-4 Mbits/sec from a source video sequence of 200 Mbits/sec. The encoder system 110 may output the coded video data to the channel 130, which may be a storage device, such as an optical, magnetic or electrical storage device, or a communication channel formed by computer network or a communication network. The decoder system 120 may retrieve the coded video data from the channel 130, invert the coding operations performed by the encoder system 110 and output decoded video data to an associated display device. The decoded video data is a replica of the source video that may include visually perceptible artifacts.

Video decoding systems 120 may have very different configurations from each other.

Portable media players, such as Apple's IPod® and IPhone® devices and competitors thereto, are portable devices that may have relatively small display screens (say, 2-5 inches diagonal) and perhaps limited processing resources as compared to other types of video decoders.

Software media players, such as Apple's QuickTime® and ITunes® products and competitors thereto, conventionally execute on personal computers and may have larger display screens (11-19 inches diagonal) and greater processing resources than portable media players. Dedicated media players, such as DVD players and Blue-Ray disc players, may have digital signal processors devoted to the decoding of coded video data and may output decoded video data to much larger display screens (30 inches diagonal or more) than portable media players or software media players. Accordingly, as video encoding systems 110 code source video, often their coding decisions may be affected by the processing resources available at a video decoder 120. Some coding decisions may require decoding processes that would overwhelm certain resource-limited devices and other coding decisions may generate artifacts in decoded video data that would be highly apparent in systems that use large displays.

Figure 2:
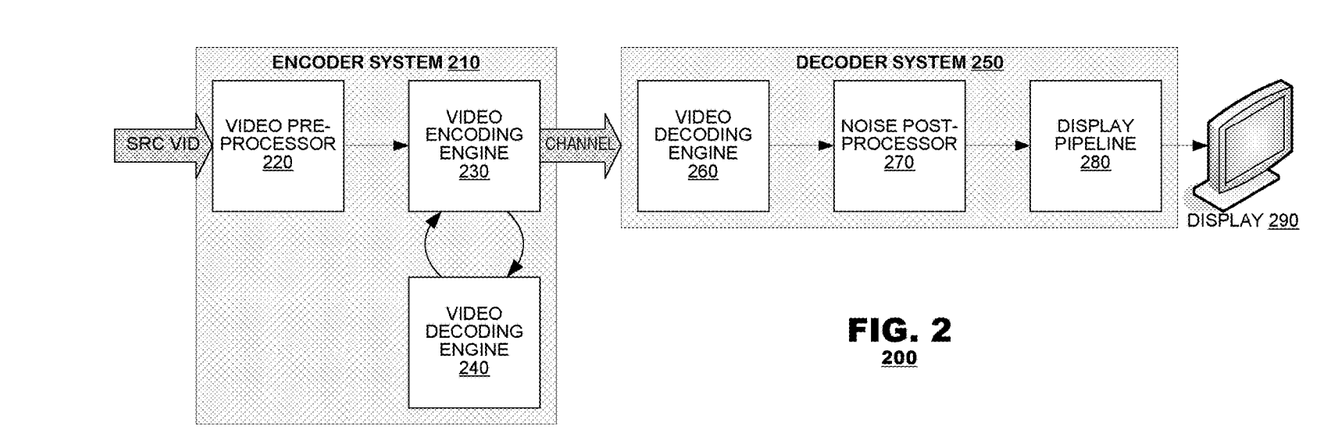
FIG. 2 is a high-level block diagram of coding processes that may occur at an encoder system and a decoder system according to an embodiment of the present invention.

FIG. 2 is a high-level block diagram of coding processes that may occur at an encoder system 210 and a decoder system 250 according to an embodiment of the present invention. At an encoder 210, video pre-processing 220 may be performed upon source video data to render video coding 230 more efficient. For example, a video pre-processor 220 may perform noise filtering in an attempt to eliminate noise artifacts that may be present in the source video sequence. Often, such noise appears as high frequency, time-varying differences in video content, which can limit the compression efficiency of a video coder. A video coding engine 230 may code the processed source video according to a predetermined multi-stage coding protocol. For example, common coding engines 230 parse source video frames according to regular arrays of pixel data (e.g., 8×8 or 16×16 blocks), called "pixel blocks" herein, and may code the pixel blocks according to block prediction and calculation of prediction residuals, quantization and entropy coding. Such processing techniques are well known and immaterial to the present discussion unless otherwise noted herein.

An encoder system 210 also may include a video decoding engine 240 to decode coded video data generated by the encoding engine 230. The decoding engine 240 generates the same decoded replica of the source video data that the decoder system 250 will generate, which can be used as a basis for predictive coding techniques performed by the encoding engine 230.

The decoder system 250 may include a decoding engine 260, a noise post-processor 270 and a display pipeline 280. The decoding engine 260 may invert coding processes performed by the encoding engine 230, which may generate an approximation of the source video data. A noise post-processor 270 may apply noise patch(es) to artifacts in the recovered video data to mask them. In an embodiment, noise patches may be identified autonomously by estimation processes performed entirely at the decoder system 250. In another embodiment, the noise patches may be identified by an encoder 210 from channel data. The post-processor 270 also may perform other post-processing operations such as deblocking, sharpening, upscaling, etc. cooperatively in combination with the noise masking processes described herein. The display pipeline 280 represents further processing stages (buffering, etc.) to output the final decoded video sequence to a display device 290.

Figure 3:
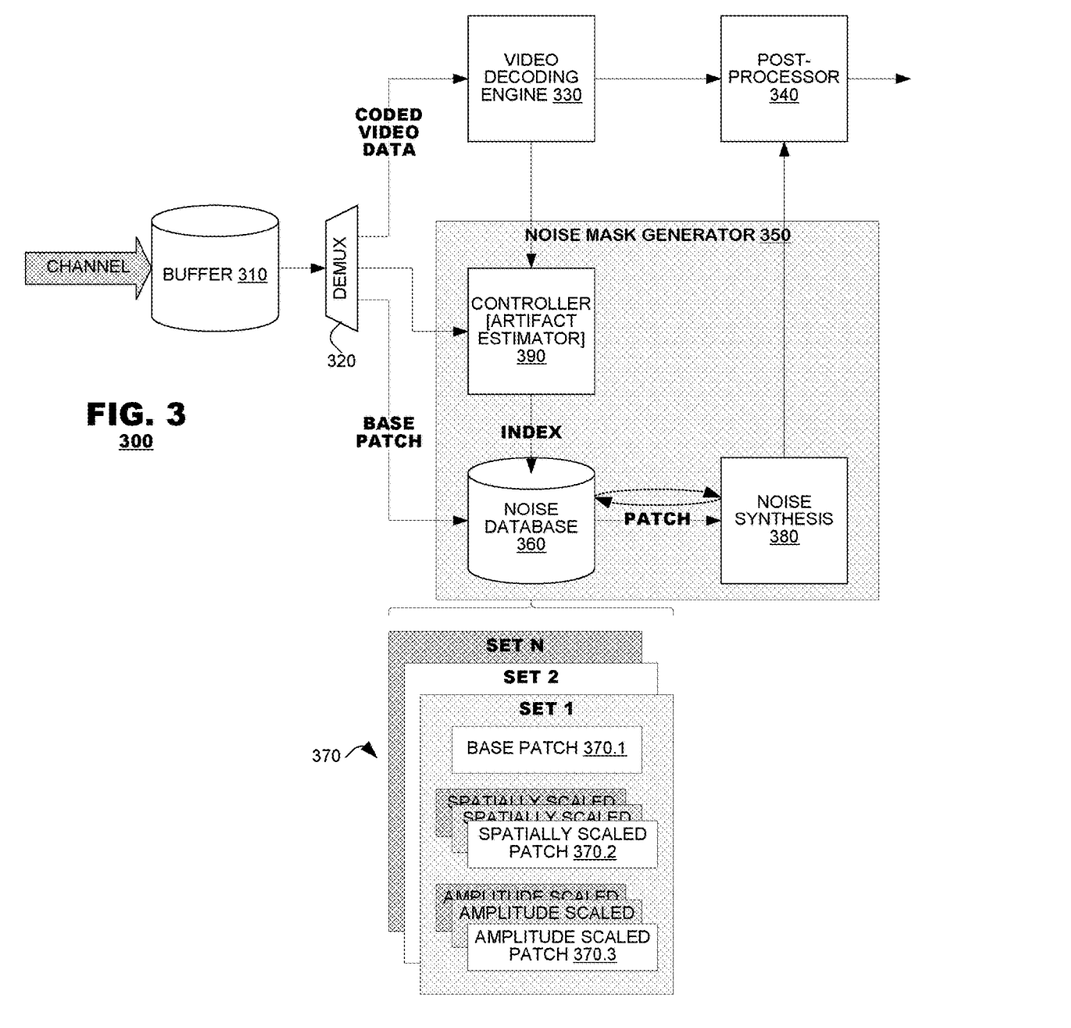
FIG. 3 is a block diagram of a video decoding system according to an embodiment of the present invention.

FIG. 3 is a block diagram of a video decoding system 300 according to an embodiment of the present invention. The system 300 may include a coded picture buffer 310, a demultiplexer 320, a video decoding engine 330 and a post-processor 340. The system 300 further may include a noise mask generator 350 provided as an adjunct to the post-processor 340. The video decoding engine 330 may decode coded data to invert coding processes performed at a video encoder (FIGS. 1 & 2) and generate recovered video. The noise mask generator 350 may store a plurality of noise maps which may be added to recovered video via the post-processor 340.

FIG. 3 also illustrates a noise mask generator 350 provided in combination with the post-processor 340. The noise mask generator 350 identifies noise patches to be applied to artifacts in the recovered video data. As discussed above, the masking processes discussed herein are one of several post-processing techniques that can be performed by a decoding system 300. For ease of discussion, the other post-processing techniques are represented by post-processor 340 in FIG. 3 and the noise masking processes are represented by noise mask generator 350. The noise mask generator 350 can be considered an element of a post-processing system 340.

As illustrated, the noise mask generator 350 may include a noise database 360 that stores various noise patches 370 of varying patterns, sizes and magnitudes. The noise mask generator 350 also may include a noise synthesis unit 380 that generates a final noise pattern from one or more noise patches 370 and outputs the final noise pattern to the post-processor. The noise mask generator 350 also may include a noise controller 390 to select patches for masking artifacts and to control storage of new patches to the noise database 360.

Noise patches may be stored to the noise database 360 in a variety of ways. First, they may be preprogrammed in the database 360 and, therefore, can be referenced directly by both the encoder and the decoding system 300 during operation. Alternatively, the encoder can communicate data defining the new patches and include them in the channel data. In such an embodiment, the decoder distinguishes the coded video data from the patch definition data and routes the different data to the video decoding engine 330 and the noise mask generator 350 respectively (represented by the multiplexer 320). For example, the encoder can include patch definitions in supplemental enhancement information (commonly, "SEI") messages transmitted to a decoder according to the H.264 coding protocol. The noise patches may be coded as run-length encoded DCT coefficients representing noise patterns.

In another embodiment, noise patterns may be defined implicitly in the coded video data and lifted from recovered video data by the noise mask generator 350 following decoding. For example, when source video includes a region of flat image data, the coded video representing such region typically will include DC coefficients representing the flat image data and very few coefficients representing high frequency changes in the region (AC coefficients). The high frequency coefficients may be interpreted by the decoding system 300 to be noise. The noise mask generator 350 may detect regions of flat image data and build noise patches from the AC coefficients, having eliminated the DC coefficients. In a first embodiment, the noise mask generator 350 may determine when to create noise maps autonomously from examination of the coded video data and a determination that the coded video data has a low number of AC coefficients. In another embodiment, an encoder may include a flag in the channel data to identify a region of coded video that the noise mask generator 350 may use for development of a new patch.

As illustrated in FIG. 3, the noise database 360 may be organized into a plurality of sets 370. Each set 370 may include a base patch 370.1 and one or more spatially-scaled and/or amplitude-scaled variants 370.2, 370.3 of the base patch 370.1. If desired, to minimize storage space allocated to the noise database 360, the spatially- and amplitude-scaled variants 370.2, 370.3 may be generated by the synthesis unit 380 during runtime as determined by the controller 390 and, therefore, need not be stored in the noise database 360. In another embodiment, the noise database 360 may store the sets in order according to strength of the patches themselves, for example, from strongest to weakest.

During operation, an encoder may identify a noise patch 370 to be used during decoding processes. For example, the encoder may maintain its own noise database (not shown in FIG. 3) that matches the database 360 present at the decoding system 300. The encoder may transmit an index number and/or scaling parameters to the decoding system 300 that expressly identifies one or more patches 370.1, 370.2 or 370.3 to be used during post-processing. In this embodiment, the controller 390 may read appropriate patches from the noise database 360 and cause the noise synthesizer 380 to scale the patches, if scaled variants are not stored in the database.

Alternatively, a decoding system 300 may derive a noise patch to be used autonomously from local operating conditions. During operation, the controller 390 may review recovered video and estimate regions of the recovered video in which visible artifacts are likely to reside. Based on the artifact estimation, the controller 390 may select one or more noise patches 370.1, 370.2 or 370.3 to integrate into the artifact-laden regions in order to mask these artifacts.

In an embodiment, the controller 390 may estimate that certain regions of image are likely to have artifacts based on a complexity analysis of those regions. Generally speaking, artifacts may be more perceptible in regions that possess semi-static, relatively flat image data but similar artifacts would be less perceptible in regions that possess relatively large amounts of structure or possess large amounts of motion. In such an embodiment, the controller 390 may estimate artifacts from an examination of quantization parameters, motion vectors and coded DCT coefficients of image data. Quantization parameters and DCT coefficients typically are provided for each coded block and/or each coded macroblock of a frame (collectively, a "pixel block"). Pixel blocks that have a relatively low concentration of DCT coefficients in an AC domain or generally high quantization parameters may be considered to have generally flat image content. If a number of adjacent pixel blocks in excess of a predetermined threshold are encountered with flat image content, the controller 390 may estimate that these adjacent pixel blocks are likely to have artifacts. By contrast, pixel blocks with a relatively high concentration of AC coefficients or relatively low quantization parameters may be estimated as unlikely to have artifacts. Similarly, if a number of pixel blocks are encountered that have flat image content but the number is lower than the predetermined threshold, the pixel blocks may be estimated as unlikely to have artifacts. These factors may be processed to develop a complexity score which may be compared to a predetermined threshold. If the complexity score falls under the threshold, it may indicate that the image content is sufficiently flat and semi-static such that artifacts are likely.

The controller's artifact estimation process also may consider motion vectors among frames during coding. The artifact estimation may trace motion vectors of pixel blocks throughout a plurality of displayed frames and estimate the likelihood that artifacts will be present based on consistency of motion vectors among frames. If a plurality of pixel blocks exhibit generally consistent motion across a plurality of frames, these pixel blocks may be estimated to have a relatively low likelihood of artifacts. By contrast, if a region includes plurality of pixel blocks that exhibit divergent motion across a plurality of frames, the region may be identified as likely having artifacts.

Additionally, artifact estimation may consider a pixel block's coding type as an indicator of artifacts. For example, H.264 defines so-called SKIP macroblocks which are coded without motion vectors and without residual having been transmitted by an encoder. Although the SKIP macroblocks yield a very low coding rate, they tend to induce artifacts in recovered video, particularly at the edges of the SKIP macroblocks. The noise mask generator 350 may identify these edges and select noise patches or combinations of noise patches 370.1, 370.2 or 370.3 that can mask these artifacts.

In an embodiment, the noise mask generator 350 may select a patch for use in post-processing. When the noise patches have different levels of noise strength, the noise mask generator 350 may select noise patches on a trial-and-error basis and integrate them with recovered video data in an emulation of post-processing activity. When a noise patch is identified that, following post-processing, increases the complexity score of the recovered video data beyond the artifact detection threshold, it may terminate the trial and error review. Alternatively, each noise patch may be stored with a quantitative complexity score. The noise patch generator 350 may identify one or more noise patches as candidates for use if the noise patches' complexity score exceeds the artifact detection threshold when summed with the pixel block's complexity score. If multiple candidate noise patches are available, the noise mask generator 350 may select the candidate with the lowest complexity.

In another embodiment, a noise mask generator 350 may derive a noise patch to be used based upon a local processing context, which may vary from decoder to decoder. For example, a first decoder may be provided as an element of a portable media player, which may have a relatively small screen (say, 2-5 inches diagonal) and which may have relatively limited processing resources as compared to other decoders. Another decoder may be provided as part of a desktop computer system, which may have an intermediate sized display screen (say, 11-19 inches diagonal) and relatively greater processing resources than the portable media player.

Another decoder may be provided in a hardware media player, which may have a relatively large display screen (say, 30 inches diagonal or more) and be provided with robust processing resources. When decoding a common coded video, a common artifact may not be as perceptible in a small display environment as they would be in a larger display environment. Moreover, the large display decoder may have greater resources to allocate for post-processing operations than are available to the small display decoder. Accordingly, the noise mask generator's estimation of the significance of noise artifacts may be based on the size of the decoder and its selection of noise patches to mask the artifacts may be based in part on the processing resources that are available locally at the decoder.

Furthermore, a noise mask generator 350 may scale selected patches according to the display size present locally at the decoder. Typically, the video decoder will generate a recovered video sequence where each frame has a certain size in pixels (say, 800 pixels by 600 pixels) but the local display may have a different size. A post-processor may scale the recovered video data, spatially enlarging it or decimating it, by a predetermined factor to fit the recovered video to the local display. In an embodiment, the noise mask generator may scale base patches by a scale corresponding to the post-processor's rescale factor.

Other embodiments of the present invention permit hybrid implementations between implied derivation of noise patches by a decoder and express identification of noise patches by an encoder. For example, in an implementation where a decoding system 300 autonomously selects patches to mask coding artifacts, an encoder (not shown) that stores its own copy of the noise database and has access to the source video may model the derivation process performed by the decoding system 300 and estimate the errors that would be induced by the decoder's derivation when compared to the source video. If the encoder determines that the decoder's derivation will induce errors in the recovered video sequence that exceed a predetermined threshold, the encoder may include an express indicator of a different noise patch that provides better performance. In such an embodiment, the noise mask generator 350 would derive noise patches autonomously subject to an override—an express patch indication—from the encoder in the channel bit stream.

In another embodiment, the encoder may include an express patch indication if the encoder performs a noise filtering process prior to coding. If the encoder determines that the decoder stores a noise patch that is a closer match to removed noise than would be achieved by the decoder's autonomous derivation of noise patches, the encoder may send an express patch indication to override the decoder's selection of a noise patch.

In an embodiment, the noise data base 360 may store base patches 370.1 of a variety of sizes. For example, it may be convenient to store base patches 370.1 that have the same size as blocks or macroblocks in the coding protocol (e.g. H.263, H.264, MPEG-2, MPEG-4 Part 2). Typically, such blocks and macroblocks are 8×8 or 16×16 regular blocks of pixels. Other coding standards may define blocks and/or macroblocks of other sizes. Herein, it is convenient to refer to such blocks and macroblocks as "pixel blocks." Base patches 370.1 of other sets may be sized to coincide with the sizes of "slices" as defined in the governing coding standard.

Figure 4:
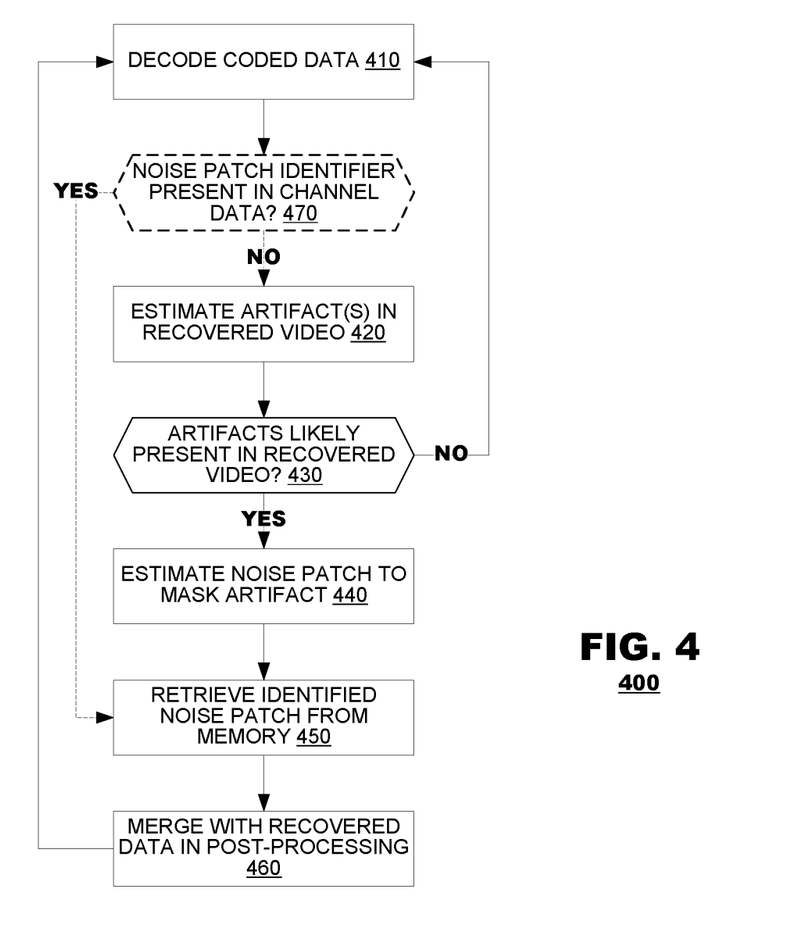
FIG. 4 illustrates a method according to an embodiment of the present invention.

FIG. 4 illustrates a decoding method 400 according to an embodiment of the present invention. As illustrated, the method may decode coded data (box 410) to generate recovered video data therefrom. Thereafter, the method may estimate whether artifacts are likely to exist in the recovered video data (boxes 420-430). If artifacts are likely to be present, the method may identify a noise patch that is estimated to mask the artifact (box 440). The method 400 may retrieve the identified noise patch from memory (box 450) and apply it to the affected region of recovered video data in a post-processing operation (box 460). The decoding, artifact estimation and post-processing operations may be performed continuously for newly received channel data and, therefore, FIG. 4 illustrates operation returning to box 410 after conclusion of operations at boxes 430 and 460 respectively.

In an alternative embodiment, the method 400 may determine whether a noise patch identifier is present in the channel data (box 470). If so, then the operations of boxes 420-440 may be omitted. Instead, operation may proceed directly to boxes 450-460 to retrieve and apply the noise patch as identified in the channel data.

Figure 5:
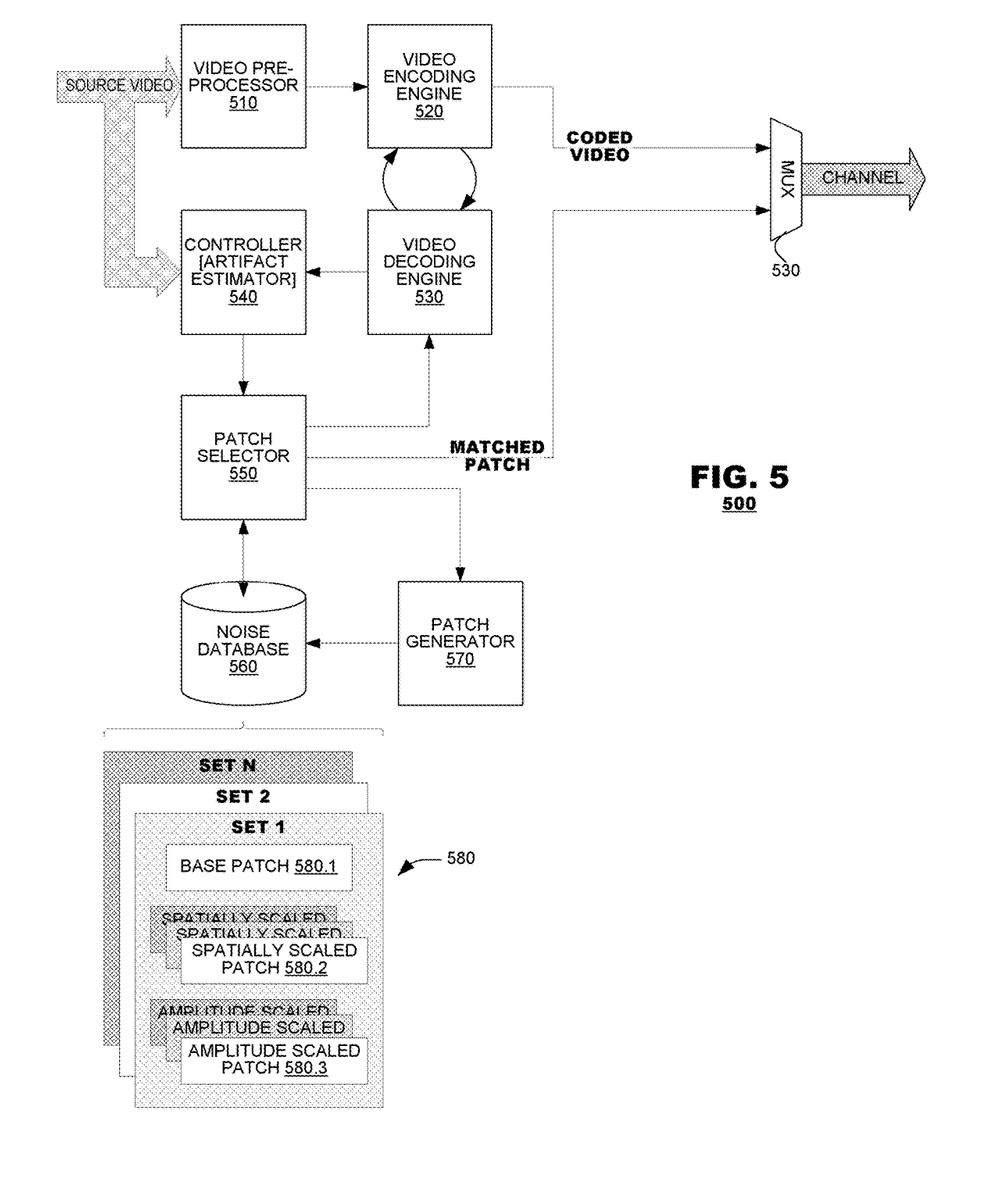
FIG. 5 illustrates a video encoder according to an embodiment of the present invention.

FIG. 5 illustrates a video encoder 500 according to an embodiment of the present invention. The video encoder 500 may include a pre-processor 510 and a video encoding engine 520. The pre-processor may receive a sequence of source video data and may perform pre-processing operations that condition the source video for subsequent coding. For example, the pre-processor 510 may perform noise filtering to eliminate noise components from the source video; noise filtering typically removes high frequency spatial and temporal components from the source video which can facilitate higher levels of compression by the video coding engine 520. The video coding engine 520 may code the processed source video according to a known protocol such as H.263, H.264, MPEG-2 or MPEG-7. Such video coding processes are well known and typically involve content prediction, residual computation, coefficient transforms, quantization and entropy coding. The video coding engine 520 may generate coded video data which may be output to a channel. The video encoder also may include a video decoding engine 530 which decodes the coded video data to support the content prediction techniques of the video coding engine 520.

According to an embodiment the video encoder 500 may include a controller/artifact estimator 540, a patch selector 550, a noise database 560 and a patch generator 570. The noise database 560 may store replica patches 580 that are available at the decoder (not shown), and may be organized into sets 580. Optionally, the noise database 560 may store spatially-scaled and amplitude-scaled patches 580.2, 580.3 in addition to the base patches 580.1.

During operation, an artifact estimator 540 may estimate visual artifacts from the recovered video data generated by the video decoding engine 530. The artifact estimator may identify regions of the recovered video where visual artifacts have appeared and may communicate such regions to the patch selector 550. Artifact estimation may proceed as described above. The patch selector 550 may select a patch (or combination of patches) from the patch database 560 to mask the identified artifacts. In an embodiment, the patch selector 550 may include an identifier of the selected patch(es) in the channel with the coded video data.

In another embodiment, when the patch selector 550 identifies the patch(es) that are to be used by the decoder, the patch selector 550 also may emulate a patch derivation process that is likely to be performed by the decoder. The patch selector 550 may determine whether the patches that would be derived by the decoder are sufficient to mask the artifacts identified by the artifact estimator 540. If so, the patch selector 550 may refrain from including patch identifiers in the channel data. If not, if unacceptable artifacts would persist in the recovered video data generated by the decoder, then the patch selector 550 may include identifiers of the selected patch(es) to override the patch derivation process that will occur at the decoder.

During operation, to determine whether a selected patch or combination of patches adequately mask detected artifacts, the patch selector 550 may output the selected patches to the video decoding engine 530, which emulates post-processing operations to merge the selected noise patches with the decoded video data. The artifact estimator 540 may repeat its artifact estimation processes on the post-processed data to determine if the selected patches adequately mask the previously detected artifacts. If so, the selected patches may be confirmed for use. If not, the patch selector 550 may attempt other selections of patch(es). Patch selection may occur on a trial and error basis until an adequate patch selection is confirmed.

In another embodiment, when the noise database 560 does not store any patches that adequately mask detected artifacts, the patch selector 550 may engage the patch generator 570, which may compute a new patch for use with the identified artifact. The patch generator 570 may generate a new patch and store it to the noise database 560. If the noise database 560 is full, a previously-stored patch may be evicted according to a prioritization scheme such as a least recently used scheme. In this embodiment, the patch selector 550 may communicate the new patch definition to the decoder in a sideband message, such as an SEI message under the H.264 protocol.

In a further embodiment, the controller 540 may estimate artifacts in the recovered video data by comparing the recovered video data to the source video data that is presented to the video pre-processor 510. In this embodiment, the patch selector 550 may model a patch derivation process that is likely to be performed by the decoder. The patch selector may determine whether the patches derived by the decoder are sufficient to mask the artifacts identified by the controller 540. If so, the patch selector 550 may refrain from including patch identifiers in the channel data. If not, if unacceptable artifacts would persist in the recovered video data generated by the decoder, then the patch selector 550 may include identifiers of the selected patch(es) to override the patch derivation process that will occur at the decoder.

In another embodiment, an encoder may define noise patterns implicitly in the coded video data without sending express definitions of noise patches in SEI messages. In such an embodiment, the controller 540 may identify a region of source video that has flat video content and select it to be used to define a new noise patch. As discussed, when source video includes a region of flat image data, the coded video representing such region typically will be dominated by DC coefficients representing the image data; it will include relatively very few high frequency AC coefficients. The high frequency coefficients may be identified by the controller 540 to be noise. Alternatively, such identifications may be performed by the video pre-processor 510 and communicated to the artifact estimator 540; this alternative may be implemented when the video pre-processor 510 performs noise filtering as a preliminary step to video coding. To create a new noise patch, the artifact estimator may control the video decoding engine 530 to cause it to decode only the coded AC coefficients of the region, without including the DC coefficient(s). The resultant decoded data may be stored in the noise database as a new noise patch. Moreover, when transmitting the coded data of the region to the decoder, the controller 540 may include a flag in the coded data to signal to the video decoder (not shown) that it, too, should decode the AC coefficients of the region and store the resultant decoded data as a new noise patch. In this manner, the noise databases at the encoder 500 and decoder (not shown) may remain synchronized.

Figure 6:
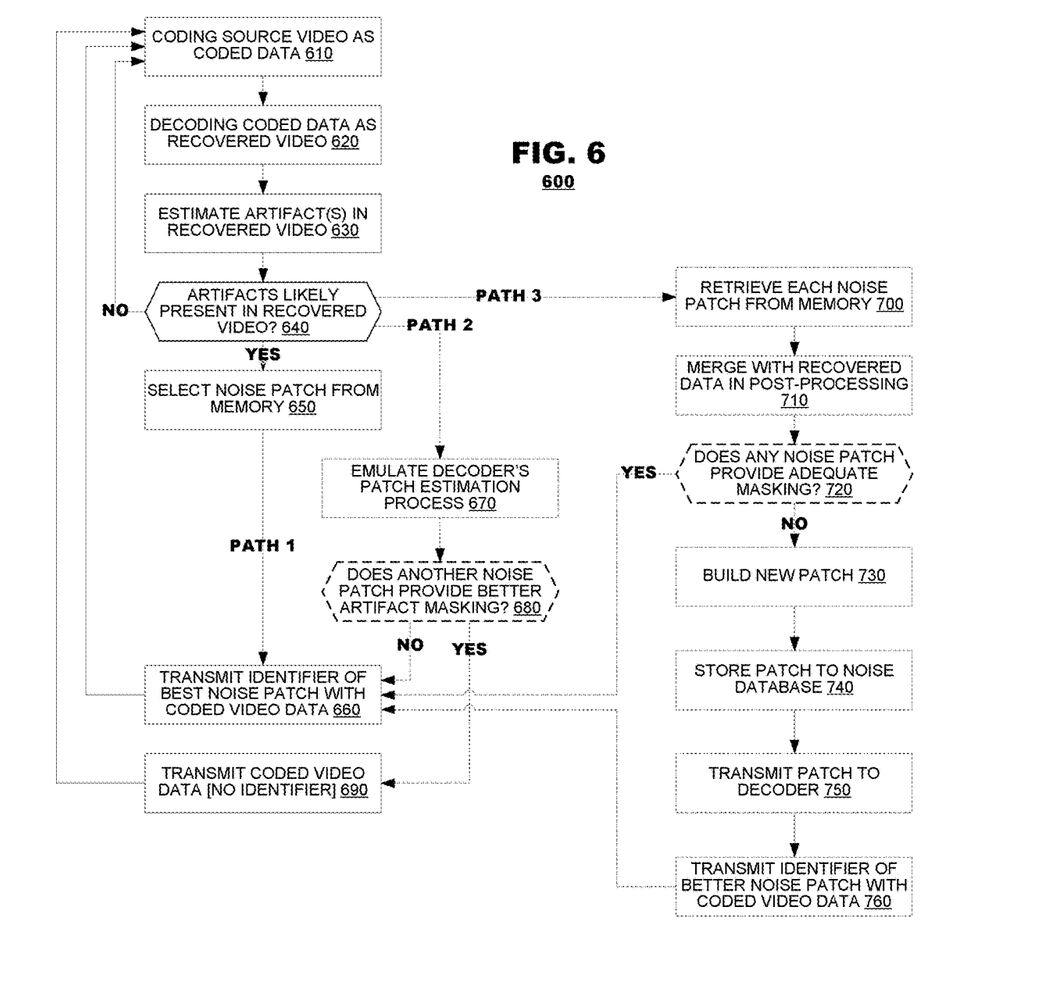
FIG. 6 illustrates a method according to another embodiment of the present invention.

FIG. 6 illustrates a coding method 600 according to an embodiment of the present invention. As illustrated, the method 600 may code source video as coded data (box 610) and, thereafter, decode the coded data (box 620) to generate recovered video data. Thus, an encoder may possess a copy of the recovered video data that will be obtained by the decoder when it receives and processes the coded video data. Thereafter, the method 600 may estimate whether artifacts are likely to exist in the recovered video data (boxes 630-640). If artifacts are likely to be present, the method may identify a noise patch that is estimated to mask the artifact (box 650). The method 600 may transmit an identifier of the selected noise patch to the decoder in channel data along with the coded data (box 660). The coding, decoding and artifact estimation may be performed continuously for newly received source video data and, therefore, FIG. 6 illustrates operation returning to box 610 after conclusion of operations at boxes 640 and 660 respectively.

In an alternative embodiment, shown as path 2 in FIG. 6, after having determined that artifacts likely are present in recovered video data (box 640), a method 600 may emulate a decoder's patch estimation process (box 670). The method 600 may determine whether its database stores another noise patch that provides better masking of artifacts than the noise patch identified by the emulation process (box 680). For example, the method 600 may perform post-processing operations using the other noise patches and determine, by comparison to the source video, whether another noise patch provides recovered data that matches the source video better than the noise patch identified by the emulation process. If a better noise patch exists, the method may transmit an identifier of the better noise patch in the channel with the coded data (box 660). If no better noise patch exists, the method may transmit the coded video data to the channel without an identification of any noise patch (box 690).

Another alternative embodiment is shown in path 3 of FIG. 6. In this embodiment, after having determined that artifacts likely are present in recovered video data (box 640), the method may serially process each noise patch in memory. The method 600 may retrieve each noise patch and add it to the recovered video data in a post-processing operation (boxes 700, 710). The method further may determine, for each such noise patch, whether the noise patch adequately masks the predicted noise artifacts (box 720). If so, if an adequate noise patch is determined, the method 600 may identify the noise patch in the channel bit stream (for example by identifying it expressly or omitting its identifier if the decoder would select it through the decoder's own processes (boxes 660, 690)). If none of the previously-stored noise patches sufficiently mask the estimated artifacts, then the method may build a new noise patch and store it to memory (boxes 730, 740). Further, the method may code the new noise patch and transmit it in the channel to the decoder (box 750), for example, by coding the noise pattern as quantized, run length coded DCT coefficients. Finally, the method may include an identifier of the new noise patch with the coded video data for which artifacts were detected when the coded video data is transmitted in the channel (box 760).

The foregoing discussion demonstrates dynamic use of stored noise patches to mask visual artifacts that may appear during decoding of coded video data. Although the foregoing processes have been described as estimating a single instance of artifacts in coded video, the principles of the present invention are not so limited. The processes described hereinabove may identify remediate multiple instances of artifacts whether they be spatially distinct in a common video sequence or temporally distinct or both.

As discussed above, the foregoing embodiments provide a coding/decoding system that uses stored noise patches to mask coding artifacts in recovered video data. The techniques described above find application in both hardware- and software-based coder/decoders. In a hardware-based decoder, the functional blocks illustrated in FIGS. 2-3 may be provided in dedicated circuit systems; the noise database may be a dedicated memory array of predetermined size. The functional units within a decoder may be provided in a dedicated circuit system such as a digital signal processor or field programmable logic array or by a general purpose processor. In a software-based decoder, the functional units may be implemented on a personal computer system (commonly, a desktop or laptop computer) executing software routines corresponding to these functional blocks. The noise database may be provided in a memory array allocated from within system memory. The program instructions themselves also may be provided in a storage system, such as an electrical, optical or magnetic storage medium, and executed by a processor of the computer system. The principles of the present invention find application in hybrid systems of mixed hardware and software designs.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A video decoder system, comprising:
   a video decoding engine to generate recovered video from a data stream of coded video data,
   a noise database storing a plurality of noise patches, and
   an artifact estimator to estimate a location of coding artifacts present in the recovered video and to select a noise patch from the database according to a noise mask identifier received in the data stream from an encoder to mask the artifacts, wherein the noise mask identifier identifies at least one noise patch from a plurality of noise patches stored in the database,
   a post-processing unit to blend the selected noise patches into the recovered video.

2. The video decoder system of claim 1, wherein the artifact estimator estimates the location of coding artifacts based on a block's coding type.

3. The video decoder system of claim 1, wherein the artifact estimator estimates the location of coding artifacts based on a size of a display device present at the video decoder system.

4. The video decoder system of claim 1, wherein the artifact estimator estimates the location of coding artifacts based on processing resources available at the video decoder system.

5. The video decoder system of claim 1, wherein noise patches have a size that matches a size of pixel blocks from the coded video data.

6. The video decoder system of claim 1, wherein the noise database stores noise patches as sets comprising:
   a base noise patch having a base size and amplitude,
   a spatially scaled variant of the base noise patch, and
   an amplitude scaled variant of the base noise patch.

7. The video decoder system of claim 1, wherein the post-processing unit scales the selected noise patches prior to integrating them into the recovered video.

8. The video decoder system of claim 1, further comprising:
   a channel buffer to receive the data stream from a channel,
   a demultiplexer to route coded video data from the channel buffer to the video decoding engine and to route data defining new noise patches to the noise database.

9. The video decoder system of claim 1, wherein when the data stream includes an express identifier of a noise patch with coded data, the artifact estimator retrieves the identified noise patch for post-processing operations.

10. A video decoder system, comprising:
    a video decoding engine to generate recovered video from a data stream of coded video data,
    a noise database storing a plurality of noise patches, and
    a noise mapping system to retrieve noise patches from the database based on an indicator from an encoder present in the data stream, the indicator identifying a patch from the plurality of noise patches stored in the noise database, and a type of scaling to be applied,
    a post-processing unit to merge the retrieve noise patches and integrate them into the recovered video according to the identified scaling.

11. The video decoder system of claim 10, wherein the patch and scaling identifications are provided in the data stream by an encoder
    the noise database stores noise patches that replicate noise patches at the encoder.

12. The video decoder system of claim 10, further comprising:
    a channel buffer to receive the data stream from a channel,
    a demultiplexer to route coded video data from the channel buffer to the video decoding engine and to route noise patch data to the noise database.

13. A video decoding method, comprising:
    decoding coded video data to generate recovered video data,
    estimating a location of coding artifacts present in the recovered video,
    selecting previously-stored noise patches from memory to mask the coding artifacts according to a noise mask identifier received in the data stream from an encoder, wherein the noise mask identifier identifies at least one noise patch from a plurality of noise patches stored in the database, and
    merging the selected noise patches into the recovered video.

14. A video decoding method comprising:
    decoding coded video data to generate recovered video data,
    based on a patch identifier provided from an encoder in a received data stream, selecting previously-stored noise patches from memory, wherein the patch identifier identifies at least one noise patch from a plurality of noise patches stored in memory,
    scaling the retrieved noise patches according to a scaling identifier provided in the received data stream, and
    merging the selected noise patches into the recovered video.

15. The video decoding method of claim 14, wherein the scaling is spatial scaling of the retrieved noise patch.

16. The video decoding method of claim 14, wherein the scaling is amplitude scaling of the retrieved noise patch.

17. A video decoding method, comprising:
    responsive to an identifier in a received data stream, decoding AC coefficients of coded video data to generate a noise patch, and
    storing the noise patch in a noise database, the noise database to be used for incorporating noise in subsequently-decoded video data during post-processing operations.

18. The video decoding method of claim 17 wherein the decoding excludes DC coefficients associated with the decoded AC coefficients.

19. The video decoding method of claim 17 further comprising, for later-received coded video data:
    decoding the later-received coded video data to generate recovered video data corresponding thereto,
    estimating a location of coding artifacts present in the recovered video,
    retrieving a stored noise patch from memory, and
    merging the retrieved noise patch into the recovered video at a location corresponding to the estimated artifact.

20. The video decoding method of claim 17, further comprising, for later-received coded video data:
    decoding the later-received coded video data to generate recovered video data corresponding thereto,
    responsive to a patch identifier provided in a received data stream, retrieving the stored noise patch from memory,
    scaling the retrieved noise patch according to a scaling identifier provided in the received data stream, and
    merging the selected noise patch into the recovered video.

21. A video encoding system, comprising:
    a video coding engine to code source video data into a coded video data, a video decoder to decode the coded video data into recovered video data, an artifact estimator to identify locations of artifacts in the recovered video data, a noise database storing noise patches, and a patch selector to select stored noise patches that mask the artifacts when integrated with the recovered video data during a post-processing operation, the patches selected according to a noise mask identifier received in the data stream from an encoder, wherein the noise mask identifier identifies at least one noise patch from a plurality of noise patches stored in the database.

22. The video encoding system of claim 21, wherein the noise database stores noise patches as sets comprising:

a base noise patch having a base size and amplitude,
a spatially scaled variant of the base noise patch, and
an amplitude scaled variant of the base noise patch.

23. A method, performed at a video encoder, comprising:
coding source video data into a coded video data,
decoding the coded video data into recovered video data,
emulating a noise patch derivation to be performed at a decoder, the emulating identifying a first noise patch of a local noise database that would be used by the decoder,
comparing recovered video data generated according to the emulation with a source video data,
determining whether the noise database includes noise patches other than the first noise patch that better mask the artifacts,
when other noise patches are identified by the determining, transmitting an identifier of the other noise patches in a channel with the coded video data in which the artifacts are located, wherein the identifiers each identify at least one noise patch from a plurality of noise patches stored in the database.

24. The method of claim 23, further comprising, when the noise database stores no noise patches that adequately mask the artifacts, generating a new noise patch and transmitting new noise patch a channel with the coded video data.

* * * * *